(12) United States Patent
Katz et al.

(10) Patent No.: US 11,294,323 B2
(45) Date of Patent: Apr. 5, 2022

(54) AIR BEARINGS

(71) Applicant: HEWLETT-PACKARD DEVELOPMENT COMPANY, L.P., Spring, TX (US)

(72) Inventors: Israel Katz, Ness Ziona (IL); Boris Khodos, Ness Ziona (IL); Avi Barazani, Ness Ziona (IL); Sergio Turnowski, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,516

(22) PCT Filed: Mar. 16, 2018

(86) PCT No.: PCT/US2018/022932
§ 371 (c)(1),
(2) Date: Oct. 16, 2019

(87) PCT Pub. No.: WO2019/177623
PCT Pub. Date: Sep. 19, 2019

(65) Prior Publication Data
US 2021/0278797 A1 Sep. 9, 2021

(51) Int. Cl.
*G03G 21/16* (2006.01)
*G03G 15/02* (2006.01)

(52) U.S. Cl.
CPC ..... *G03G 21/1647* (2013.01); *G03G 15/0216* (2013.01); *G03G 21/1671* (2013.01)

(58) Field of Classification Search
CPC ........... G03G 21/1647; G03G 15/0216; G03G 21/1671; G03G 15/025; G03G 2215/0402; G03G 2215/02; G03G 15/04; G03G 15/04036; G03G 15/04045; G03G 15/02
See application file for complete search history.

(56) References Cited

U.S. PATENT DOCUMENTS

| | | | |
|---|---|---|---|
| 3,642,377 A * | 2/1972 | Young | G03B 27/72 355/88 |
| 4,074,283 A | 2/1978 | Fink et al. | |
| 4,905,026 A | 2/1990 | Day | |
| 5,940,665 A * | 8/1999 | Domoto | G03G 15/11 399/249 |
| 7,681,986 B2 | 3/2010 | Shamoun et al. | |
| 8,063,924 B2 | 11/2011 | Tanaka | |
| 9,592,685 B2 | 3/2017 | Rigio et al. | |

(Continued)

FOREIGN PATENT DOCUMENTS

| | | |
|---|---|---|
| EP | 0071469 A1 | 2/1983 |
| EP | 1209539 A2 | 5/2002 |

(Continued)

*Primary Examiner* — Sandra Brase
(74) *Attorney, Agent, or Firm* — Middleton Reutlinger (57) ABSTRACT

An air bearing assembly is disclosed. The air bearing assembly may comprise a print component to interact with an imaging plate, the imaging plate being rotatable relative to the print component. The air bearing assembly may comprise an air bearing pad positioned adjacent to a surface of the imaging plate, the air bearing pad to generate a cushion of air to maintain a defined distance between the print component and the imaging plate. A method and a print apparatus are also disclosed.

13 Claims, 6 Drawing Sheets

(56) References Cited

U.S. PATENT DOCUMENTS

| | | | | |
|---|---|---|---|---|
| 2004/0213600 | A1* | 10/2004 | Watanabe | G03G 15/0216 |
| | | | | 399/159 |
| 2007/0280737 | A1* | 12/2007 | Berg | G03G 9/125 |
| | | | | 399/240 |
| 2009/0033735 | A1 | 2/2009 | Leoni et al. | |
| 2010/0020301 | A1* | 1/2010 | Sugiyama | G03G 15/326 |
| | | | | 355/67 |

FOREIGN PATENT DOCUMENTS

| | | |
|---|---|---|
| EP | 3042247 A1 | 7/2016 |
| EP | 3095612 A1 | 11/2016 |
| JP | 2002244068 A | 8/2002 |
| WO | 2010/106079 A1 | 9/2010 |
| WO | 2015/034523 A1 | 3/2015 |
| WO | WO2016118147 A1 | 7/2016 |

* cited by examiner

AIR BEARINGS

BACKGROUND

In some printing systems, rollers are used to transfer print agent from one surface to another.

One example of a printing technology that may be implemented in the field of printing is liquid electrophotography (LEP). LEP printing may involve the transfer of electrically-charged liquid ink via a series of rollers to a substrate. The transfer of ink may involve interactions between multiple rollers and/or between a roller and another component.

BRIEF DESCRIPTION OF DRAWINGS

Examples will now be described, by way of non-limiting example, with reference to the accompanying drawings, in which.

DETAILED DESCRIPTION

The disclosure herein relates to an air bearing and its use with a component of a printing apparatus. Aspects of the disclosure may be implemented in printing systems using various different printing technologies. Some examples are described in the context of one particular technology, liquid electrophotography.

In a liquid electrophotography (LEP) printing system, print agent, such as ink, is stored in a reservoir and may be transferred using a binary ink developer (BID). Each BID transfers print agent of a particular colour, so an LEP printing system may include, for example, seven BI Ds. Print agent from a BID is selectively transferred from a developer roller of the BID in a layer of substantially uniform thickness to an imaging plate, such as a photo imaging plate (PIP). The selective transfer of print agent may be achieved through the use of electrically-charged print agent. The entire imaging plate, which may be located on a rotatable roller or drum, may be charged, using a charge roller (e.g. a ceramic charge roller), which rotates relative to the imaging plate. Areas on the imaging plate representing an image to be printed may then be discharged, for example by forming a latent image on the imaging plate using a laser beam or other type of light. Print agent is transferred to those portions of the imaging plate that have been discharged. The imaging plate may transfer the print agent to another roller, such as an intermediate transfer member (ITM), which may be covered by a replaceable print blanket. The print agent may subsequently be transferred onto a printable substrate, such as paper.

In other printing systems, the imaging plate may comprise a surface other than a PIP. For example the imaging plate may comprise a sleeve formed or placed around a roller or drum. Such a sleeve may be formed from a material which can be selectively charged and discharged. In some examples, the sleeve may be formed from a particularly delicate or fragile material which may be damaged easily if knocked, for example.

In order for the imaging plate to be charged, the charge roller is brought into close proximity with the imaging plate. Other components of the printing system may also be brought into close proximity with the imaging plate in order to interact with it during the printing process. For example, a writing head, or print head, may be brought into close proximity with the imaging plate to generate the latent image from the imaging plate, for example by discharging particular portions of the charged imaging plate. The writing head may include a laser source and/or an LED or LED array. In order for the writing head to generate the latent image accurately, the writing head is to be positioned at a particular distance from the imaging plate during use.

According to the present disclosure, an air bearing mechanism is used to maintain a defined separation between components of the printing system, such as the writing head and/or the charge roller, and the imaging plate.

Figure 1:
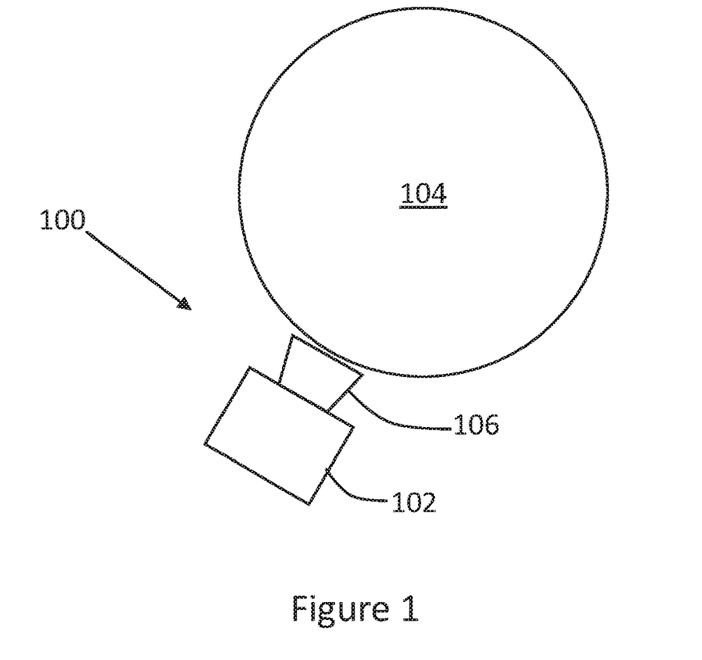
FIG. 1 is a simplified schematic of an example of an air bearing assembly.

Referring to the drawings, FIG. 1 is a simplified, schematic illustration of an air bearing assembly 100. The air bearing assembly 100 comprises a print component 102 to interact with an imaging plate 104, the imaging plate being rotatable relative to the print component. The air bearing assembly 100 also comprises an air bearing pad 106 positioned adjacent to a surface of the imaging plate. The air bearing pad 106 is to generate a cushion of air to maintain a defined distance between the print component and the imaging plate. In some examples, the air bearing pad 106 may be positioned between the print component and the imaging plate.

An air bearing, also referred to as an aerostatic bearing, is a bearing that uses a thin film or cushion of pressurised gas (e.g. air) to create a load-bearing interface between a surface of the air bearing and another surface. The cushion of gas between the surfaces prevents the surfaces from contacting one another and, therefore, very low amounts of friction exist at the interface. Generally, in an air bearing, pressurised air is forced through apertures formed in an air bearing pad. In some examples, the air bearing pad may comprise a porous or partially-porous material. In other examples, the air bearing pad may include discrete apertures or orifices, and in other examples, the air bearing pad may include slots through which the pressurised gas passes.

Pressurised gas forced through the air bearing has the effect of reducing friction between the air bearing pad 106 and the imaging plate 104. The pressurised gas may be supplied by a compressor. In some examples, the air bearing pad 106 may be forced towards the imaging plate 104, as discussed below. Forcing the air bearing pad towards the imaging plate helps to minimize the gap between them, and compressing the gas cushion helps to increase the stiffness ratio of the air bearing, allowing it to support loads with minimal oscillatory motion. The pressure of gas supplied through the air bearing pad 106 is chosen to create a relatively high spring stiffness of the gas cushion, such that any compression of the gas cushion is damped as much as possible.

An air bearing pad, such as the air bearing pad 106, may be used to maintain a defined distance or separation between various different print components and the imaging plate 104. In some examples, the print component 102 may comprise a writing head to generate a representation of an image to be printed. The representation may be generated on the imaging plate 104 as the imaging plate is rotated relative to the writing head. As noted above, the writing head, also referred to as a print head, may include a laser source and/or an LED or LED array to selectively discharge portions of the imaging plate 104. In this way, writing head may be considered to write, or create, a latent image on the imaging plate 104 which represents the image to be printed. In some examples, the writing head, or a portion thereof, may move along part of or all of the length of the imaging plate 104 in order to generate the latent image. In some examples, such as those in which the writing head comprises an LED radiation source, the writing head may include a lens to focus the radiation on the surface of the imaging plate 104. Such a writing head may have a shallow focus depth of field (e.g. ±40 µm). Thus, if the writing head is moved away from or towards the imaging plate 104 while the latent image is being generated on the imaging plate, then the LED may go out of focus, resulting in a print defect, such as a print artefact. It is, therefore, intended that the writing head is kept at a constant distance from the imaging plate 104 during use, and this can be achieved using an air bearing assembly 100 as described herein.

In some examples, the print component 102 may comprise a charge generation component to generate a charge on the imaging plate. For example, the charge generation component may comprise a charge roller. In some examples, the charge generation component may rotate relative to the imaging plate 104. For example, the charge generation component may rotate in an opposite direction to the direction of rotation of the imaging plate 104.

Figure 2:
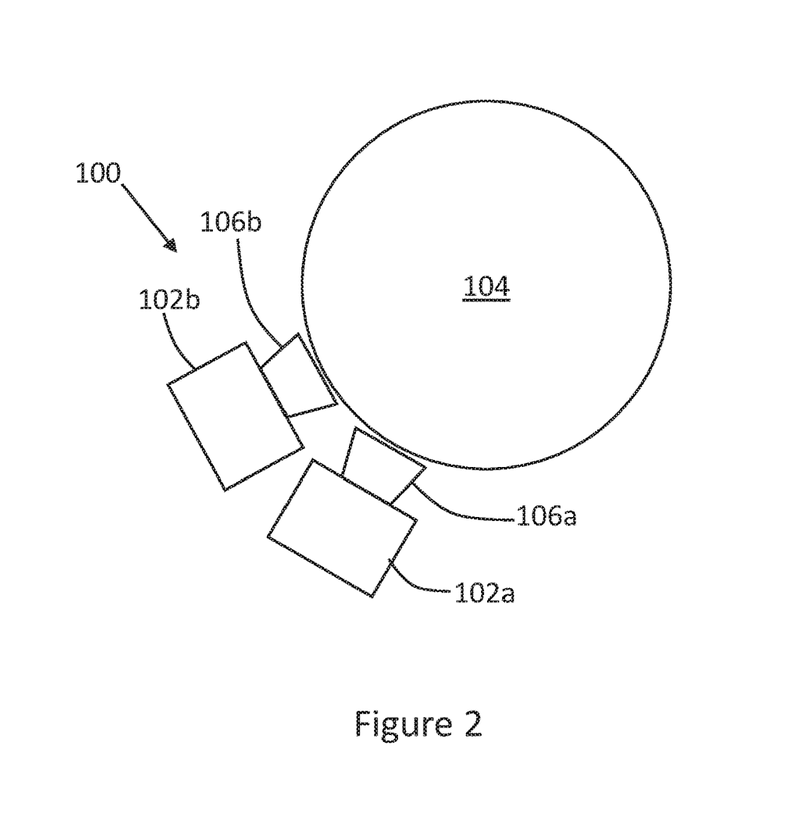
FIG. 2 is a simplified schematic of an example of multiple air bearing assemblies.

In some examples, multiple air bearing assemblies 100 may be included in a printing system. FIG. 2 is a simplified, schematic illustration of multiple air bearing assemblies. In this example, a first print component 102a has an associated first air bearing pad 106a, and a second print component 102b has an associated second air bearing pad 106b. In some examples, the first air bearing pad 106a may be positioned between the first print component 102a and the imaging plate 104, and the second air bearing pad 106b may be positioned between the second print component 102b and the imaging plate 104. In other examples, the air bearing pads 106a, 106b may be positioned elsewhere relative to the print components 102a, 102b, while still serving to maintain a constant defined distance between the print components and the imaging plate 104. In the example shown in FIG. 2, the first print component 102a may, for example, comprise a writing head and the second print component 102b may, for example, comprise a charge generation component, such as a charge roller.

Figure 3:
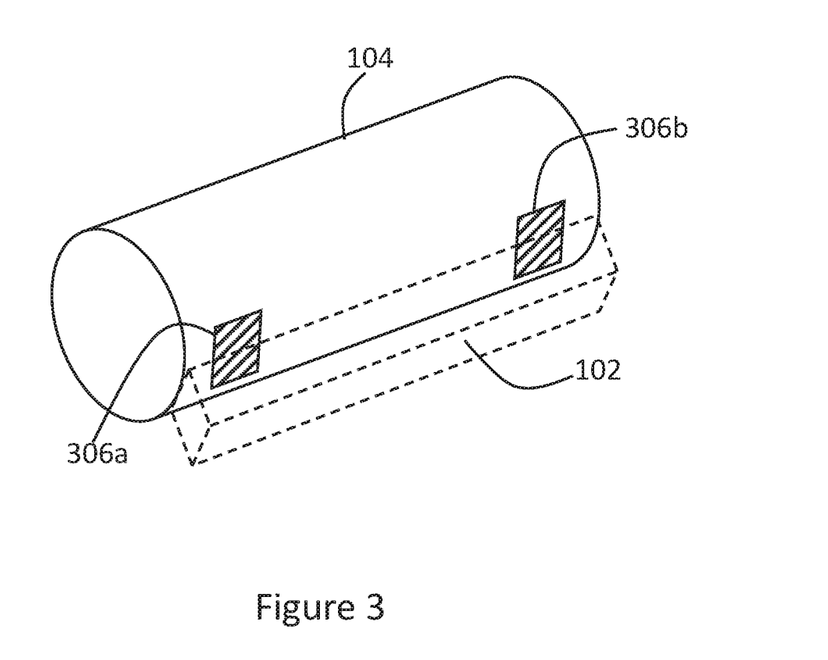
FIG. 3 is a simplified schematic of a further example of an air bearing assembly.

According to some examples, a single air bearing pad 106 may be provided for each print component 102. For example, the air bearing pad 106 may be positioned centrally with respect to the print component and/or may extend partially or fully along the length of the print component 102. In other examples, multiple air bearing pads 106 may be provided for each print component 102. FIG. 3 is a simplified schematic of a further example of the air bearing assembly 100. FIG. 3 shows the imaging plate 104 in a schematic perspective view. In this example, the air bearing assembly 100 includes a pair of air bearing pads 306a, 306b to maintain the print component 102 (shown with a dashed line for clarity) at a defined distance from the imaging plate 104. The air bearing pads 306a, 306b may, for example, be located at, or near to, either end of the print component 102. In this way, the print component 102 may interact with the imaging plate 104 in a central region (i.e. between the air bearing pads 306a, 306b).

Figure 4:
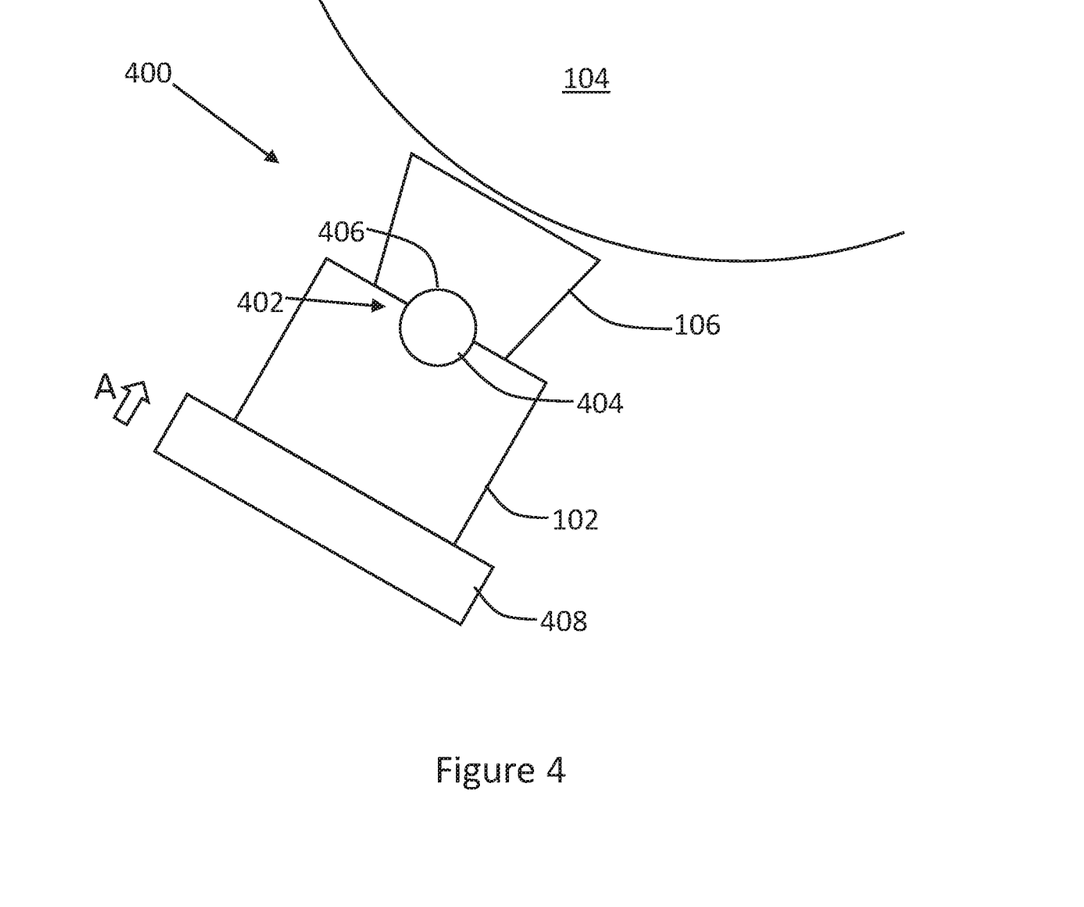
FIG. 4 is a simplified schematic of a further example of an air bearing assembly.

The print component (or print components) 102 may be mounted relative to the imaging plate 104 using various mounting techniques. In some examples, the print component 102 may be mounted to the air bearing pad 106 using a ball joint. A ball joint, also referred to as a spherical joint or a ball-and-socket joint, is a type of connection which allows for free rotation about the joint. FIG. 4 is a simplified schematic of a further example of an air bearing assembly 400. In the air bearing assembly 400, the print component 102 is connected to the air bearing pad 106 by a ball/spherical joint 402. The ball joint 402 may include a ball member or spherical member 404 provided at an end (or both ends) of the print component 102. The ball member 404 is received, or partially received, in a recess 406 formed in the air bearing pad 106, such that the air bearing pad is rotatable relative to the ball member. With this arrangement, when pressurised gas is delivered through the air bearing pad 106 towards the imaging plate 104, the air bearing pad may rotate about the ball member 404 into a stable position relative to the imaging plate. In this way, the air bearing pad 106 is able to align appropriately to the surface of the imaging plate 104. In some examples, a ball joint 402 may be provided at both ends of the print component 102 while, in other examples, the print component may be connected to the air bearing pad 106 using a different fixing at one or both ends.

In some examples, the air bearing assembly 100, 400 may further comprise a biasing member 408 to urge the print component 102 towards the imaging plate 104. The biasing member 408 may serve to apply a force to the print component 102 in the direction of the imaging plate 104, as indicated in FIG. 4 by the arrow A. The force supplied by the biasing member 408 acts against the force resulting from the pressurised gas being directed onto the surface of the imaging plate 104. This helps to maintain the defined separation between the print component 102 and the imaging plate 104. As the imaging plate 104 rotates about its axis, run-out (e.g. radial run-out) may result if the axis of rotation of the imaging plate 104 is not perfectly central with regard to the outer surface of the imaging plate. By urging the print component 102 (and therefore the air bearing pad 106) towards the imaging plate 104 as the imaging plate is rotated, any run-out is compensated for as the air bearing pad (and therefore the print component) will be caused to track the surface of the imaging plate. In other words, the print component 102 will be kept at the defined distance from the imaging plate 104, even if run-out causes the location of the surface of the imaging plate relative to the axis of the imaging plate (or roller/drum) to vary as it rotates.

Thus, during use, the imaging plate 104 rotates relative to the print component 102. The air bearing assembly 100, 400 causes the formation of a gas cushion between the air bearing pad 106 and the imaging plate, and the thickness of the gas cushion is maintained constant, or approximately constant, due to the biasing force generated by the biasing member 408. Accordingly, the distance between the print component 102 and the imaging plate 104 is also kept constant, or approximately constant. In some examples, the air bearing pad 106 is to generate a cushion of gas to maintain a defined distance between the print component 102 and the imaging plate 104 of between around 5 micrometres (µm) and around 10 µm. In other examples, the defined distance may be between around 5 µm and around 15 µm. In other examples, the defined distance may be between around 5 µm and around 20 µm. In other examples, the defined difference may be larger or smaller, and the defined distance may depend on the nature and purpose of the print component 102.

By using an air bearing assembly 100, 400 as the mounting mechanism to mount the print component 102 relative to the imaging plate 104, contact between the mounting mechanism and the imaging plate can be prevented. Thus, there is far less risk that any contact between the mounting mechanism and the imaging plate 104 will cause damage to the imaging plate. Therefore, the air bearing pad 106 may be positioned such that the gas cushion is formed between the air bearing pad and a portion of the surface of the imaging plate 104 which might receive the latent image to be printed. In other words, the mounting mechanism (i.e. the air bearing assembly) can act directly on an active portion of the imaging plate 104, rather than on an inactive portion, such as end of a drum on which the imaging plate is mounted.

Since there is no contact between the air bearing pad 106 and the imaging plate 104, no vibrations (or negligible vibrations) are induced between the components. Such vibrations could result in print defects. Therefore, mounting the print component 102 relative to imaging plate 104 using an air bearing assembly 100, 400 may reduce the chance of print defects being introduced.

Figure 5:
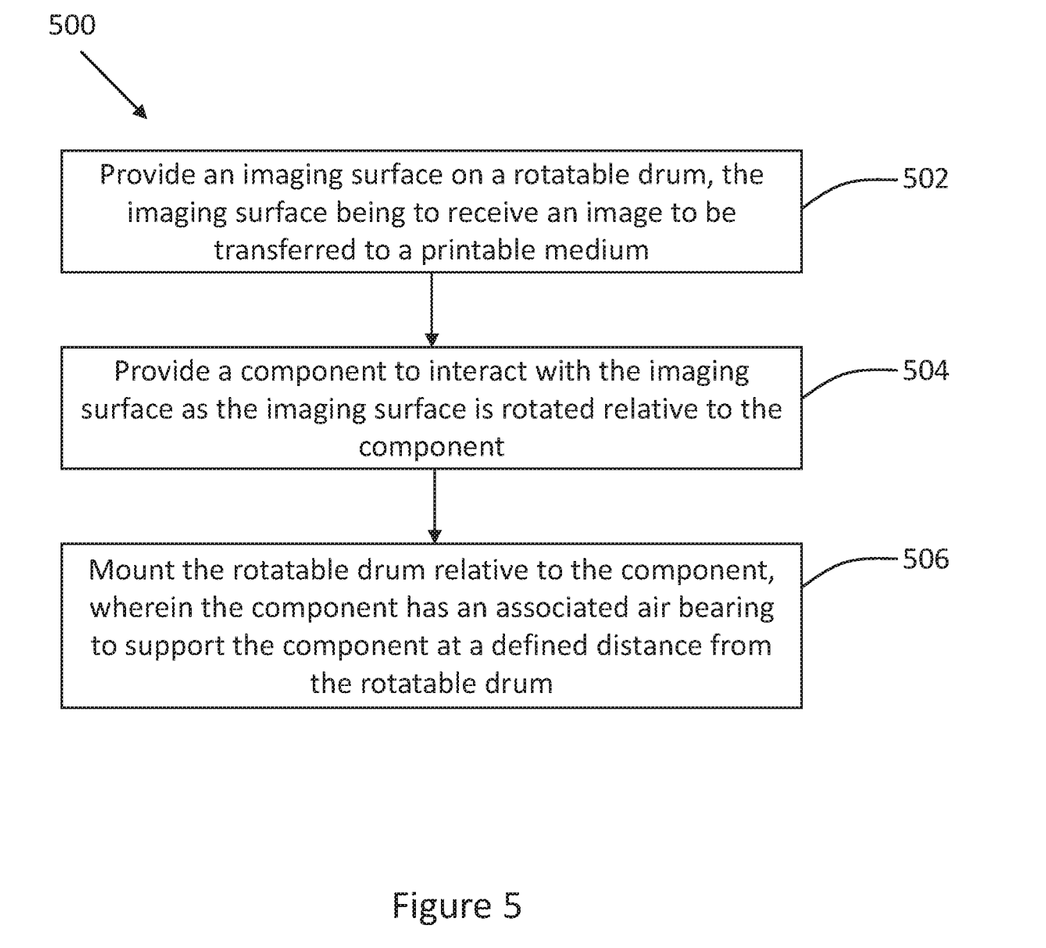
FIG. 5 is a flowchart of an example of a method of constructing a print apparatus.

An aspect of the disclosure relates to a method. The method may, in some examples, be considered to be a method of constructing or assembling a print apparatus. FIG. 5 is a flowchart of an example of a method 500 for assembling a print apparatus. The method 500 comprises, at block 502, providing an imaging surface on a rotatable drum, the imaging surface being to receive an image to be transferred to a printable medium. In some examples, the imaging surface may comprise the imaging plate 104 discussed above. The imaging surface may be formed as a sleeve around the rotatable drum. The imaging surface may receive the image in the form of a latent image, which may be generated using a radiation source, such as an LED or a laser incorporated into a writing head, or print head.

At block 504, the method 500 comprises providing a component to interact with the imaging surface as the imaging surface is rotated relative to the component. The component may, in some examples, comprise the print component 102 discussed above. For example, the component may comprise a charge-forming component, such as a charge roller, or a writing head or print head to form the latent image on the imaging surface. In other examples, the component may comprise another component which may interact with the imaging surface during use.

The method 500 also comprises, at block 506, mounting the rotatable drum relative to the component. The component may have an associated air bearing to support the component at a defined distance from the rotatable drum. The air bearing may comprise the air bearing assembly 100, 400 discussed above. By mounting the component and the rotatable drum in this way, a cushion of gas can be formed between the air bearing and the imaging surface on the rotatable drum without the air bearing or the component coming into contact with the imaging surface. As a result, the risk of damage to the imaging surface (e.g. as a result of an impact with the component or vibrations between the imaging surface on any mounting assembly of the component) may be greatly reduced.

Figure 6:
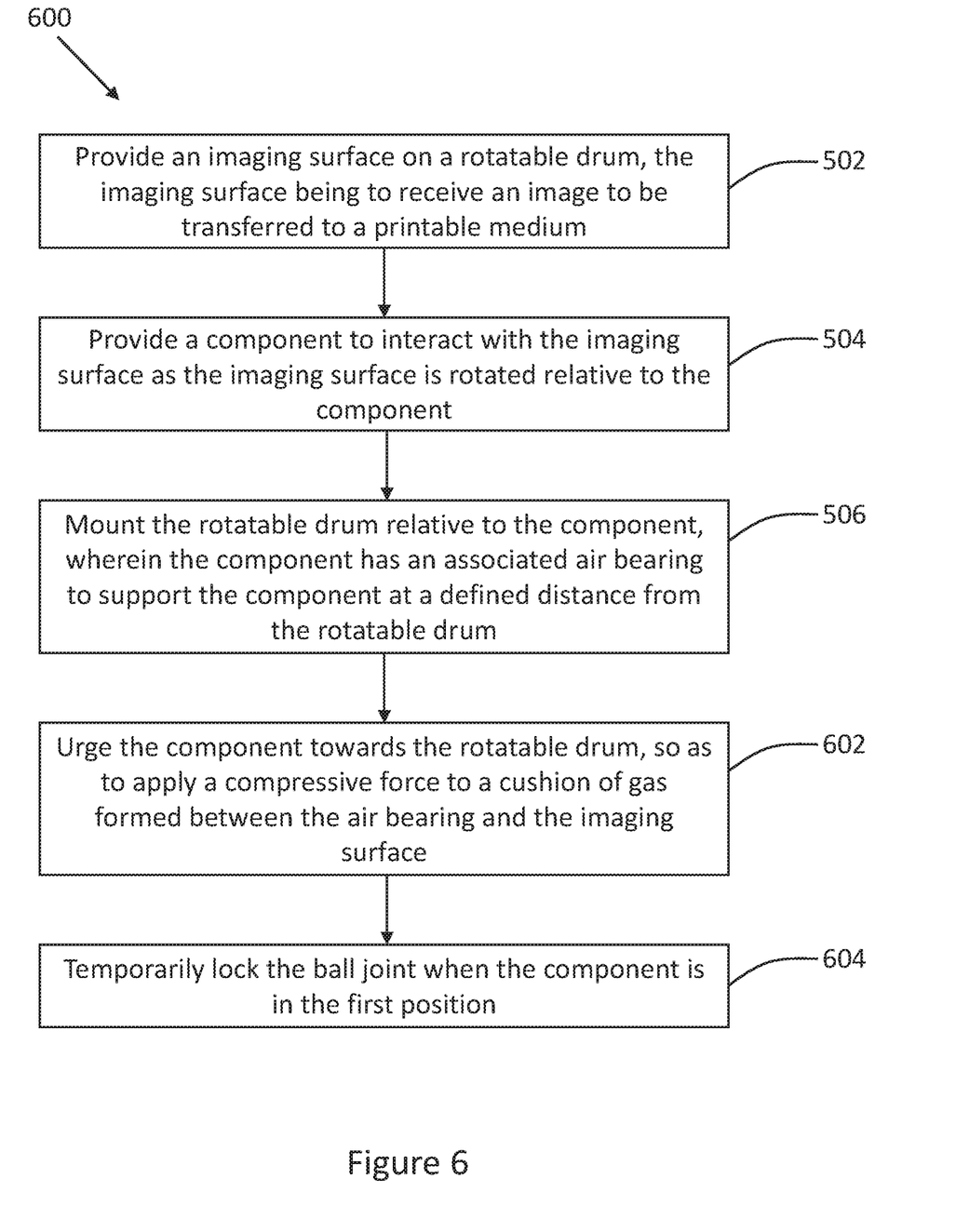
FIG. 6 is a flowchart of a further example of a method of constructing a print apparatus.

FIG. 6 is a flowchart of a further example of a method 600 for assembling a print apparatus. The method 600 may include blocks of the method 500 discussed above. For example, the method 600 may include blocks 502, 504 and 506. The method 600 may further comprise, at block 602, urging the component towards the rotatable drum, so as to apply a compressive force to a cushion of gas formed between the air bearing and the imaging surface. In some examples, the component may be urged towards the rotatable drum using a biasing mechanism, such as the biasing member 408 discussed above. In other examples, the component may be urged towards the rotatable drum as a result of the manner in which the rotatable drum and/or the component are mounted relative to one another.

In some examples, the component may be moveable relative to the rotatable drum between a first position in which the component is to interact with the imaging surface and a second position in which the component is not to interact with the imaging surface. For example, when it is intended that the component is to interact with the imaging surface (e.g. to apply a charge to the imaging surface or generate a latent image by selectively discharging portions of a charged imaging surface) the component may be moved into the second position (e.g. an active position) for the interaction to take place. Once the interaction has been completed, the component may be moved into the first position (e.g. an inactive position).

As noted above, the component may, in some examples, be mounted to the air bearing by a ball joint (also referred to as a spherical joint). Such a mounting allows the component to rotate relative to the imaging surface. The method 600 may comprise, at block 604, temporarily locking the ball joint when the component is in the first position. In this way, once the component is in its intended, active position relative to the rotatable drum, the ball joint may be locked, so that further movement of the component relative to the imaging surface is prevented.

Figure 7:
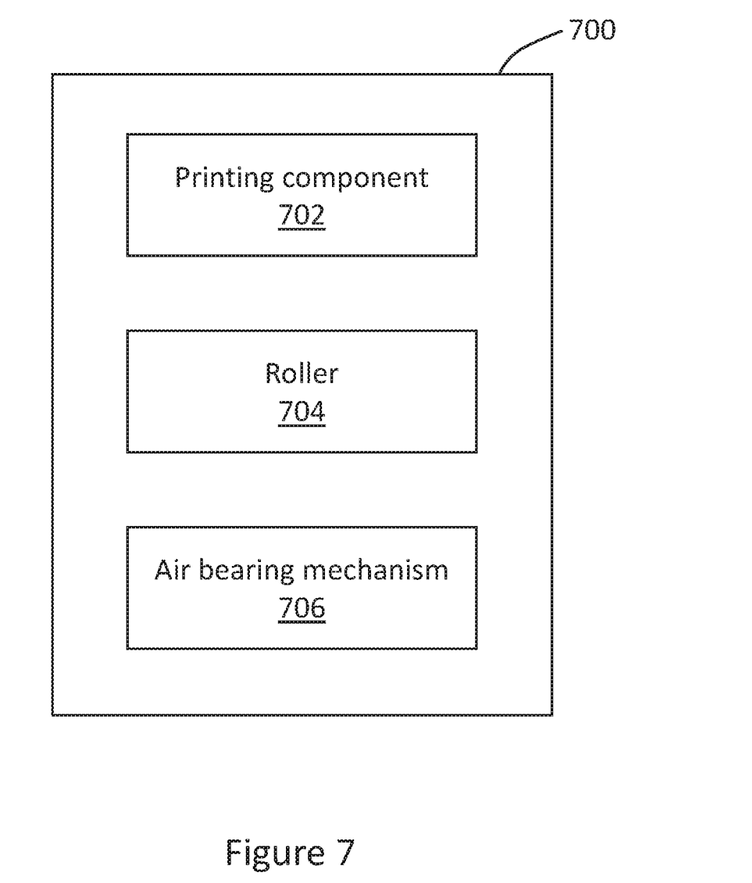
FIG. 7 is a simplified schematic of an example of a print apparatus.

A further aspect of the disclosure relates to a print apparatus. A print apparatus may, for example, incorporate an air bearing assembly 100, 400 as described above. FIG. 7 is a simplified schematic of a print apparatus 700. The print apparatus 700 comprises a roller 704 having a photoconductive surface located thereon to receive an image to be printed. The roller 704 may, for example, comprise the imaging plate 104 of the rotatable drum discussed above. The print apparatus 700 further comprises a printing component 702 to interact with the photoconductive surface as the roller 704 rotates relative to the printing component. The print apparatus 700 further comprises an air bearing mechanism 706 associated with the printing component 702, the air bearing mechanism to maintain a defined separation between the roller and the printing component as the roller rotates. The air bearing mechanism 706 may comprise the air bearing assembly 100, 400, or the air bearing discussed above. By directing pressurised gas through the air bearing mechanism 706, a cushion of gas may be formed between the air bearing mechanism and the photoconductive surface on the roller 704. The cushion of gas may prevent the air bearing mechanism 706 and/or the printing component 702 from coming into contact with the photoconductive surface which, in turn, may reduce the chance of the photoconductive surface being damaged.

As the roller 704 rotates relative to the printing component 702 during use, the thickness of the cushion of gas formed between the photoconductive surface and the air bearing mechanism is maintained substantially constant (e.g. by urging the print component towards the photoconductive surface as discussed above). Therefore, the distance between the printing component and the photoconductive surface can be kept constant, or substantially constant, during use.

The printing component 702 may comprise any component used in the print apparatus 700 which is to interact with the photoconductive surface. In some examples, the printing component may comprise a print head to generate a representation of the image on the photoconductive surface as the roller is rotated relative to the print head. For example, as noted above, the print head, or writing head, may generate radiation to selectively discharge portions of a charged photoconductive surface so as to represent the image to be printed. In other examples, the printing component may comprise a charge generation component to generate a charge on the photoconductive surface as the roller is rotated relative to the charge generation component. The charge generation component, which may be a charge roller, may apply a charge to the entire photoconductive surface before portions of the photoconductive surface are selectively discharged, for example using the print head or writing head discussed above.

In some examples, the printing component 702 may be mounted to the air bearing mechanism 706 using a spherical joint (also referred to as a ball joint). By using a spherical joint, the air bearing mechanism 706 may rotate about the joint so as to be aligned with the photoconductive surface. In other words, the air bearing mechanism (e.g. an air bearing pad of the air bearing mechanism) may rotate into a position in which the air bearing pad is substantially parallel to the photoconductive surface.

The air bearing assembly 100, 400 and air bearing mechanism 706 discussed herein may be incorporated into any type of print apparatus in which an imaging plate or photoconductive surface is rotatable relative to a component intended to interact with the imaging plate or photoconductive surface. In some examples, the print apparatus 700 may comprise a liquid electrophotography (LEP) print apparatus.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An air bearing assembly, comprising:
   a print component to interact with an imaging plate, the imaging plate being rotatable relative to the print component; and
   an air bearing pad positioned adjacent to a surface of the imaging plate, the air bearing pad to generate a cushion of air to maintain a defined distance between the print component and the imaging plate, wherein the print component is mounted to the air bearing pad using a ball joint.

2. The air bearing assembly according to claim 1, wherein the print component comprises a writing head to generate a representation of an image to be printed, the representation to be generated on the imaging plate as the imaging plate is rotated relative to the writing head.

3. The air bearing assembly according to claim 1, wherein the print component comprises a charge generation component to generate a charge on the imaging plate.

4. The air bearing assembly according to claim 1, further comprising: a biasing member to urge the print component towards the imaging plate.

5. The air bearing assembly according to claim 1, wherein the air bearing pad is to generate a cushion of gas to maintain a defined distance between the print component and the imaging plate of between around 5 micrometres and around 10 micrometres.

6. The air bearing assembly according to claim 1, wherein the air bearing pad is to generate the cushion of air between the air bearing pad and the imaging plate.

7. A method comprising:
   providing an imaging surface on a rotatable drum, the imaging surface being to receive an image to be transferred to a printable medium;
   providing a component to interact with the imaging surface as the imaging surface is rotated relative to the component; and
   mounting the rotatable drum relative to the component;
   wherein the component has an associated air bearing to support the component at a defined distance from the rotatable drum, and the component is mounted to the air bearing by a ball joint.

8. The method according to claim 7, further comprising:
   urging the component towards the rotatable drum, so as to apply a compressive force to a cushion of gas formed between the air bearing and the imaging surface.

9. The method according to claim 7, wherein the component is moveable relative to the rotatable drum between a first position in which the component is to interact with the imaging surface and a second position in which the component is not to interact with the imaging surface;
   wherein the method further comprises:
   temporarily locking the ball joint when the component is in the first position.

10. A print apparatus comprising:
   a roller having a photoconductive surface located thereon to receive an image to be printed;
   a printing component to interact with the photoconductive surface as the roller rotates relative to the printing component; and
   an air bearing mechanism associated with the printing component, the air bearing mechanism to maintain a defined separation between the roller and the printing component as the roller rotates, wherein the printing component is mounted to the air bearing mechanism using a spherical joint.

11. The print apparatus according to claim 10, wherein the printing component comprises a print head to generate a representation of the image on the photoconductive surface as the roller is rotated relative to the print head.

12. The print apparatus according to claim 10, wherein the printing component comprises a charge generation component to generate a charge on the photoconductive surface as the roller is rotated relative to the charge generation component.

13. The print apparatus according to claim 10, wherein the print apparatus comprises a liquid electrophotography print apparatus.

* * * * *